(No Model.)

G. F. SIMONDS.
BALL BEARING.

No. 449,965. Patented Apr. 7, 1891.

Witnesses,
Robert Burnett,
Geo. W. Rea.

Inventor:
George F. Simonds,
By James L. Norris.
Atty.

THE NORRIS PETERS CO., PHOTO-LITHO., WASHINGTON, D. C.

UNITED STATES PATENT OFFICE.

GEORGE F. SIMONDS, OF FITCHBURG, MASSACHUSETTS.

BALL-BEARING.

SPECIFICATION forming part of Letters Patent No. 449,965, dated April 7, 1891.

Application filed December 30, 1890. Serial No. 376,291. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

My invention relates to ball-bearings for taking the end-thrust of shafts, axles, or other rotary parts in various kinds of machinery; and it consists, essentially, in the combination, with spherical rollers or balls confined in a cage or series of cages, of disks or hardened plane surfaces located on opposite sides of said ball-retaining cage or cages in contact with the laterally-projecting balls and connected in such a manner that the cage or cages and one of said disks will be free to rotate in or on the other disk which may be held stationary, both of said disks and the interposed cage or cages of confined balls being capable of insertion into and removal from the bearing in a body.

Figure 1:
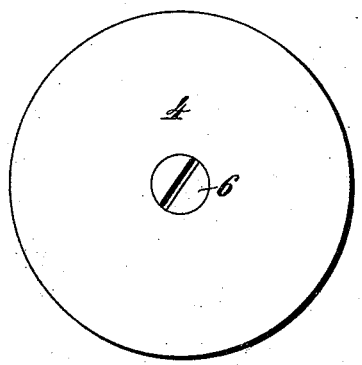
Figure 2:
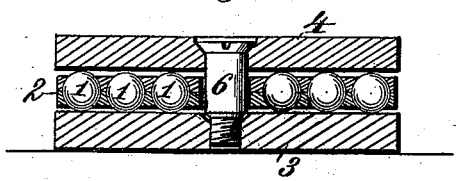
Figure 3:
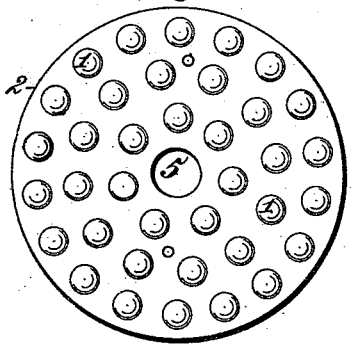
Figure 4:
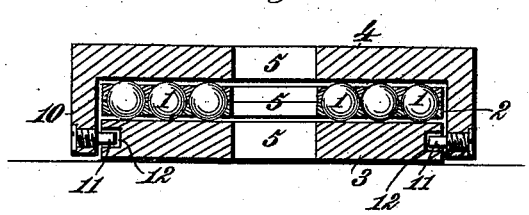
Figure 5:
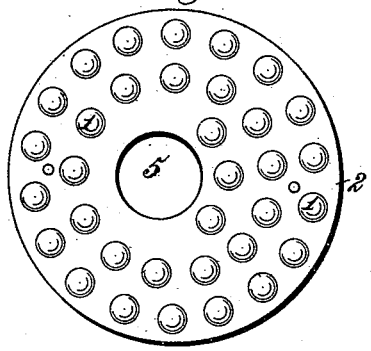
Figure 6:
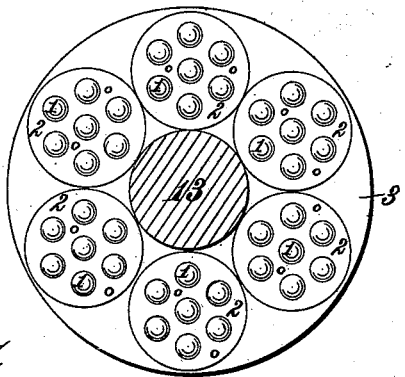
Figure 7:
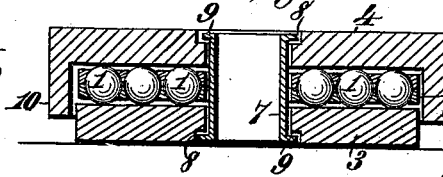

In the annexed drawings, Figure 1 is a plan, and Fig. 2 is a transverse section, of a thrust ball-bearing, illustrating one form of my invention, in which the disks are connected at the center. Fig. 3 is a plan of a cage in which are confined a number of spherical rollers or balls for resisting end thrust or pressure. Fig. 4 is a transverse section of a thrust ball-bearing adapted to surround a shaft and in which the disks are loosely connected at their peripheries. Fig. 5 is a plan of a cage having an eccentrically-located opening to surround a shaft and cause the confined balls to travel in eccentric paths and cover more extended surfaces during the rotation of the cage, so as to distribute and diminish the friction and wear. Fig. 6 is a view of a thrust-bearing surrounding a shaft with one of the disks removed, and showing a series of separate independently-rotary ball-retaining cages to distribute the friction. Fig. 7 is a transverse section of another form of thrust ball-bearing, showing another mode of connecting the disks centrally and preventing the access of dust.

Referring to the drawings, the numeral 1 designates spherical rollers or balls arranged in a cage or cages 2 and projecting therefrom in position to resist end thrust or pressure.

In order to provide the ball-bearing with two hardened plane surfaces, between which the cage 2 is to be interposed, and which will be removable with said cage or cages in a body, the hard-metal disks 3 and 4 are arranged on opposite sides of said cage or cages, as shown, and said disks are constructed and loosely connected in such a manner that the disks and cage or cages of confined balls will be held together and made to revolve on each other, so as to distribute the friction and greatly reduce the wear of contacting surfaces.

As shown in Figs. 1, 2, and 3, the circular cage 2 and each disk 3 and 4 may be provided with a central opening 5 for passage of a screw-bolt 6, which may be fast in the disk 3, as shown in Fig. 2, but is of less diameter than the openings in the cage 2 and disk 4, so that said cage and disk 4 will be capable of revolving on each other and on the disk 3, while the rolling action of the spherical rollers or balls 1 in contact with the disks will resist and distribute the end-thrust of a shaft or other rotary part bearing against the outer surface of the revolving disk.

Instead of connecting the disks 3 and 4 by a central pin or screw-bolt 6, as just described, the said disk and interposed cage may be provided with larger central openings to surround a shaft or axle in contact with a collar or shoulder thereon, and the central connection of the disks and cage, so as to hold them together in a body when removed, can be accomplished by means of a tube or sleeve 7, passed through the central openings of the disks and cage and having its ends flanged or upset to engage countersunk recesses 8 in the outer surfaces of the disks 3 and 4, as shown in Fig. 7. By means of the upset or flanged ends 9 of the tube 7, engaged in the recesses 8, the cage 2 and disks 3 and 4 will be centrally connected, so as to be capable of revolving on each other and can be placed on and removed from a shaft in a body. The tube 7 also serves to exclude the entrance of dust between the shaft and disks, and, if desired, one of the disks may be provided with a flange 10 to prevent the entrance of dust at the periphery of the ball-bearing.

As shown in Fig. 4, the flange 10 of the disk 4 may be of sufficient width to wholly embrace the periphery of the disk 3, and said disks and interposed cage or cages can be connected and held together in a body by means of a series of pins or screws 11 in the flange 10 of one disk engaging a circular groove 12 in the periphery of the other disk in such a manner that the parts will be free to revolve on each other. In this construction, also, the disks and cage may have central openings 5 of such diameter as to permit the passage of a shaft or axle.

In either of the above-described forms of construction the circular cage 2 may have its opening 5 placed eccentrically, as shown in Fig. 5, so that the rotation of said cage will cause the confined balls 1 to travel in eccentric paths, and thereby distribute the frictional wear.

When one of the disks 3 or 4 is provided with a flange 10, a series of ball-retaining cages 2 may be made to surround a shaft 13, as shown in Fig. 6, in which the several cages are capable of independent rotation. By this construction and arrangement of independently-rotary cages, each of which also revolves around the central shaft, the balls confined in said cages will revolve on constantly-changing surfaces and any individual cage can be removed and replaced when required without disturbing the others.

What I claim as my invention is—

1. In a ball-bearing, the combination of two hardened plane surfaces, an interposed cage, and spherical rollers or balls retained in said cage and adapted to revolve on said plane surfaces, the said cage and hardened plane surfaces being held together and all removable in a body, substantially as described.

2. A ball-bearing consisting of two hardened plane surfaces and an interposed eccentrically-placed cage containing spherical rollers or balls, substantially as described.

In testimony whereof I have hereunto set my hand and affixed my seal in presence of two subscribing witnesses.

GEO. F. SIMONDS. [L. S.]

Witnesses:
JAMES L. NORRIS,
JAMES A. RUTHERFORD.